Dec. 23, 1941.　　　E. E. LYNCH ET AL　　　2,267,408
THERMAL DEMAND INDICATOR
Filed May 11, 1940　　　3 Sheets-Sheet 1

Inventors:
Edward E. Lynch,
Herbert C. Thomas,
Samuel Gabrielson,
by Harry E. Dunham
Their Attorney.

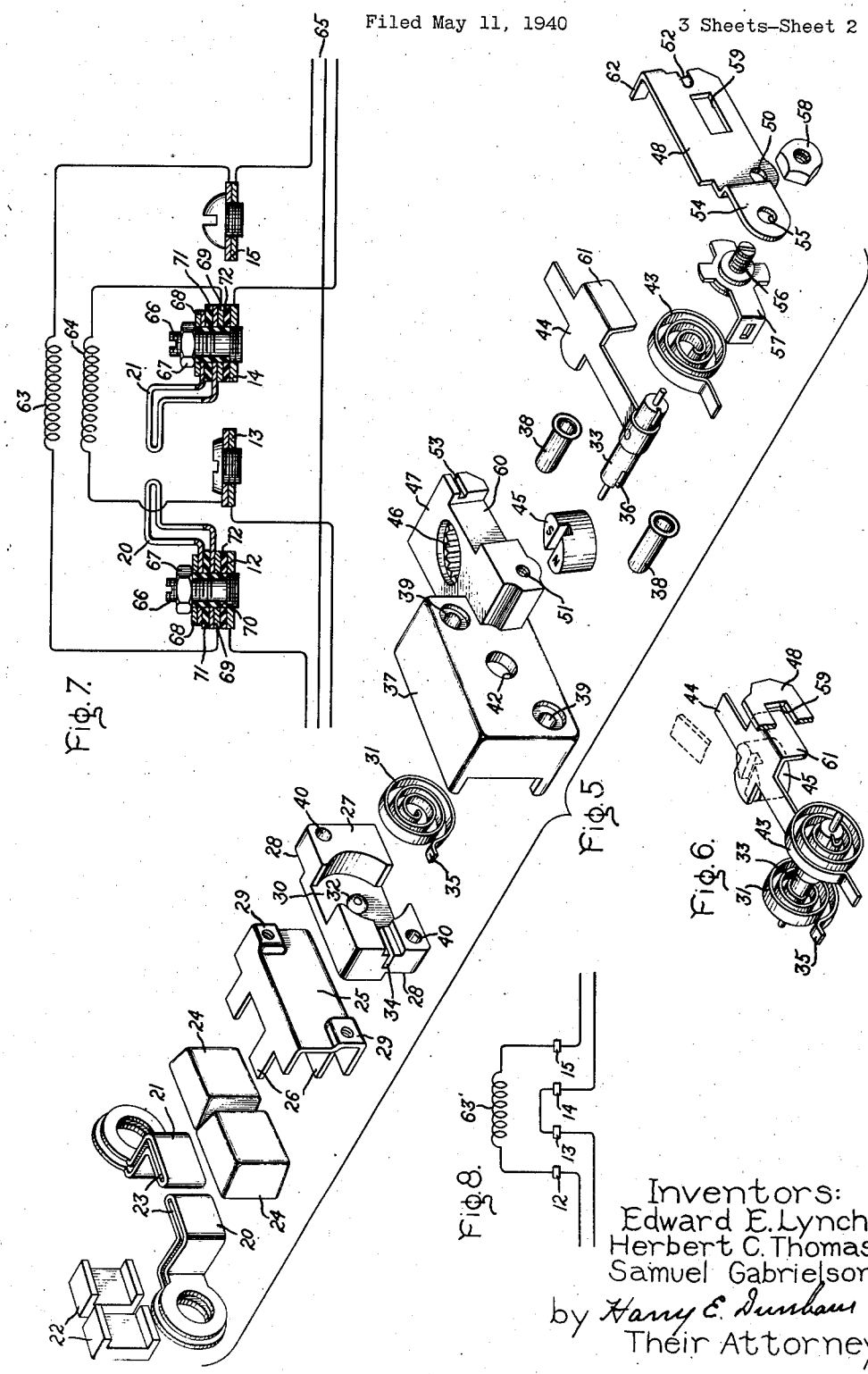

Inventors:
Edward E. Lynch,
Herbert C. Thomas,
Samuel Gabrielson,
by Harry E. Dunham
Their Attorney.

Patented Dec. 23, 1941

2,267,408

UNITED STATES PATENT OFFICE 2,267,408

THERMAL DEMAND INDICATOR

Edward E. Lynch, Easthampton, Herbert C. Thomas, Lynn, and Samuel Gabrielson, South Lynnfield, Mass., assignors to General Electric Company, a corporation of New York Application May 11, 1940, Serial No. 334,590

2 Claims. (Cl. 177—311)

Our invention relates to a thermal demand indicator which is adapted to be mounted on the terminals of a watt-hour meter, for example, to give an indication that the current demand through the meter has or has not exceeded a predetermined amount. Our invention relates to improvements in the general type of thermal demand indicator described in United States Letters Patent No. 1,935,093 to E. L. Keller, issued November 14, 1933, although it might conceivably be made in a form with a dual indicator; one position indicating that the demand has not exceeded the operating point and another position of the indicator indicating that the demand has exceeded the operating demand.

One object of our invention is to provide a reliable low cost thermal demand indicator which is made in two separable parts, one part including a heater energized by the load current and secured in fixed relation to the meter terminals and the other part containing the thermal responsive indicator mechanism, said parts being easily separable and interchangeable with other parts having different calibration constants, or adjustments for the purpose of changing the rating of the device.

Another object of our invention is to provide a thermal demand indicator in which the thermal responsive indicator moves from one indicating position to another indicating position or from non-indicating to indicating position by a snap action such that friction of moving parts, although it may be present, does not appreciably influence the calibrated operation of the device. In accomplishing this object we prefer to make use of a movable indicator which is made in part at least, but not necessarily entirely, of magnetic material and a permanent magnet for snapping the indicator between different indicating positions when the thermal responsive restraining force decreases to a predetermined value in response to heating. Another feature of our invention is to provide a wide range of calibration in a simple manner after the device is installed on the terminals of the watthour or other meter with which it may be associated by the simple expedient of rotating an accessible ambient temperature compensating spiral support.

Figure 1:
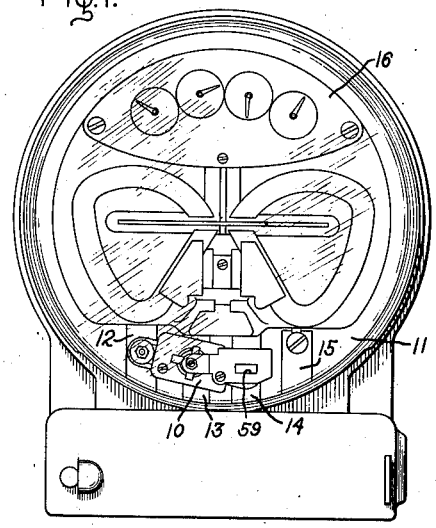
Figure 2:
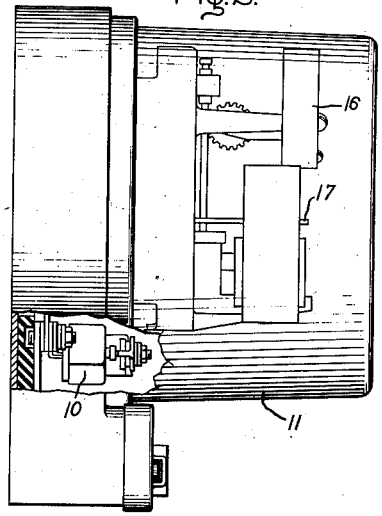
Figure 3:
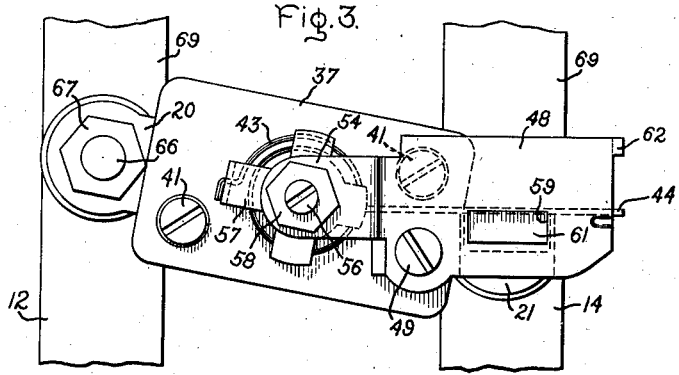
Figure 4:
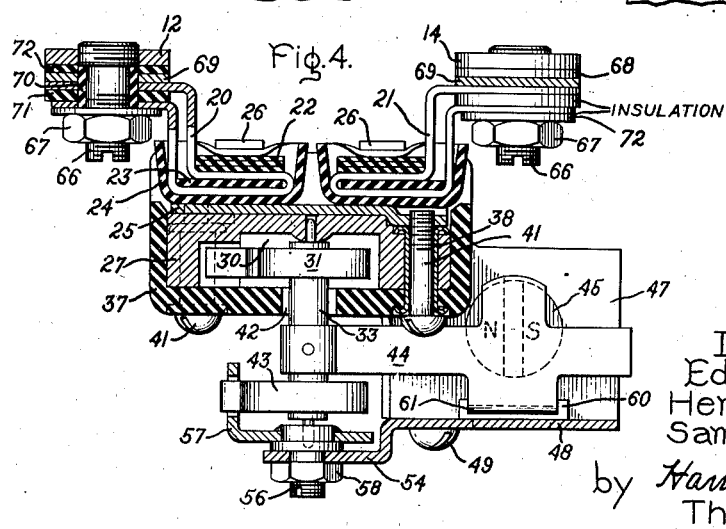
Figure 9:
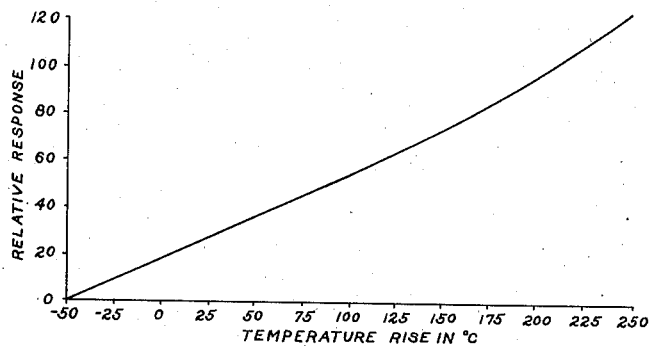
Figure 10:
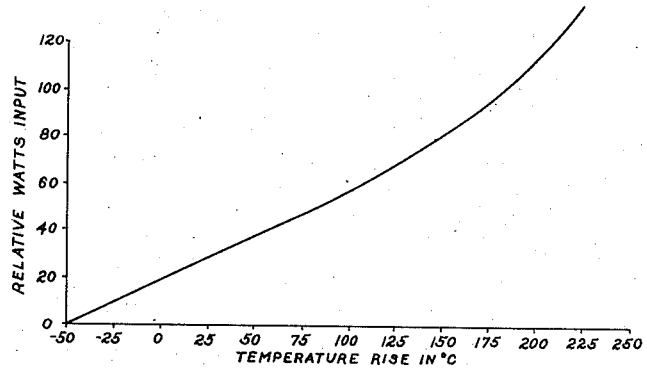
Figure 11:
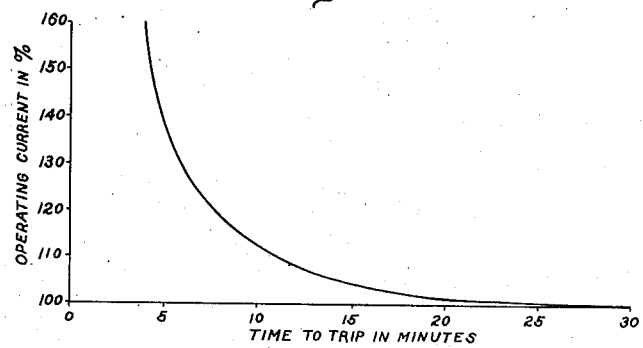

The features of our invention which are believed to be novel and patentable will be pointed out in the claims appended hereto. For a better understanding of our invention, reference is made in the following description to the accompanying drawings in which Figs. 1 and 2 represent face and side views of our thermal demand meter and indicator as attached to an ordinary induction watthour meter; Fig. 3 is an enlarged face view of the indicator; Fig. 4 is a sectional plan view of a preferred form of our demand metering indicator; Fig. 5 represents a perspective exploded view of the various parts of the device shown in Fig. 4; Fig. 6 represents a perspective view of the thermal operating and temperature compensating unit; Fig. 7 is a wiring diagram illustrating connections of the heater elements of our device for a three-wire meter installation; Fig. 8 shows the circuit wiring for a two-wire watthour meter; and Figs. 9, 10, and 11 are temperature characteristic curves that will be referred to in explaining the design and calibration of our device.

Our demand measuring and indicating device is shown at 10 in Figs. 1 and 2 and, as there indicated, it is a small, compact device, enclosed within the transparent glass cover 11 of an ordinary watthour meter so as to be readily seen and read without removing the meter cover. Its small size permits such use without any rearrangement of the ordinary watthour meter parts and since it is mounted directly on and over the terminals 12, 13, 14 and 15 of the watthour meter, it requires no extra wiring and in no way interferes with the installation, mechanical operation and accessibility of the watthour meter, nor does it decrease the visibility of those parts of the watthour meter such as the dial 16 and disk 17 used for reading and calibrating purposes. As will be more apparent from the description to follow, this device is easily installed on or removed from the ordinary watthour meter. When present it indicates to the meter reader whether or not the current demand through the meter has exceeded a predetermined demand for which the indicator is adjusted. It may be used temporarily as a survey device to indicate whether or not a given installation requires a meter of a larger rating, or heavier wiring, etc. It is contemplated, however, that the device will have sufficiently high accuracy and be sufficiently low in cost as to be used as a permanent meter accessory and be used as a guide for rate making purposes in connection with many installations using appreciable power, but not enough power to justify the higher cost and greater accuracy of a block interval type of watthour or volt-ampere hour demand meter.

The preferred construction and manner of assembly of our thermal demand measuring and indicating device, now to be explained, is best illustrated by Figs. 3, 4, 5 and 6. The device is provided with one or two active heater elements depending upon whether it is used with two- or three-wire service. In the illustration, two heater elements are shown at 20 and 21. These are loop resistance elements bent into the angular shape illustrated and are preferably made of a material having a low temperature coefficient of resistance such as manganin. It will be noted that our thermal demand indicator is entirely supported on the regular meter terminals, in this instance on terminals 12 and 14 by having the terminals of the heater elements bolted to such meter terminals. The heater elements are suitably insulated by the insulation material at 22, 23 and 24. The insulation pieces 22 are U-shaped blocks extending beneath and at the sides of the heaters, the insulation piece 23 separates the two parts of the loops of the heaters, and the cup-shaped insulation parts 24 cover the tops and extend down over all sides of each of the heaters and insulate the heaters from each other and from the metal shield clip 25 made of copper. The pieces 23 may be omitted where, as in most cases, the heater elements are sufficiently rigid to maintain the loop spacing. The heater elements together with their required insulation parts are assembled and held together as a substantially rigid unit by the shield clip 25 which partially encases the parts and has tongues 26 which are bent under the heater units under pressure to unite the parts into a unitary structure. This heater unit is fastened on the meter terminals before the thermal responsive metering instrument unit is fastened thereon.

The thermal responsive measuring and indicating instrument unit includes a heat storage block 27 made of metal and preferably an aluminum alloy which permits the block to be die cast. Its lower surface is shaped to fit snugly against the top of clip 25 and has depressions at 28 to receive the threaded projections 29 of the clip 25. The heat storage block 27 has a hollowed out central cavity 30 to receive the bimetallic spiral 31. A bearing 32 for the lower end of shaft 33 is also contained in the block 27 and the side of the block has a slit 34 to receive and hold the outer end 35 of the spiral 31. The inner end of the spiral 31 enters a slit 36 in the shaft 33 and connects the spiral in driving relation with such shaft when the parts are assembled as in Fig. 4. Means are taken to ensure a tight fit between spiral and shaft.

The heat storage block is contained within and secured in an open bottom housing or casing structure 37 made of molded insulating material. The block 27 is fastened therein by means of hollow rivets 38 which pass through aligned openings 39 and 40 in the casing and block respectively. These hollow rivets also contain bolts 41 by means of which the instrument unit is secured to the heater unit, the threaded ends of the bolts entering the threaded openings at 29 of the clip 25. When the bolts are removed, the instrument unit may be removed from the heater unit and when the parts are assembled and these bolts tightened, both units are securely fastened together with the heat storage block in close contact with the clip 25, and with the extended walls of the casing partially enclosing the heater unit so as to provide efficient heat transfer from the heater unit to the bimetallic spiral 31.

The shaft 33 extends through an opening 42 in the upper wall of the casing and is fastened to the inner end of a second bimetallic spiral 43 outside of the casing in the same way as the previously mentioned spiral is fastened thereto. The spiral 43 is to compensate the instrument for changes in ambient temperature and is mounted in opposed relation to spiral 31. The shaft 33 also carries an indicating element 44 made of magnetic material so as to be attracted under certain conditions by a permanent magnet 45. This moving element is shown assembled in Fig. 6 and assembled in the casing structure in Fig. 4.

The small U-shaped permanent magnet 45 is tightly secured in an opening 46 in a block-like extension 47 of the molded casing with the poles of the magnet upward as the parts are viewed in Fig. 5. A brass plate 48 is supported on the front of the extension 47. This plate is fastened to the block by a screw 49 (see Figs. 3 and 4) which passes through the opening 50 in the plate and enters the threaded opening 51 in the block. The upper corner of the right-hand end of the plate is bent around to embrace the outer right upper edge of the block and an off-set at 52 enters a slot 53 in the block to assist in locating and in securing the plate firmly to the block when the parts are assembled.

The plate 48 has the raised extension 54 having an opening 55 into which is secured the top bearing for the shaft 33. This bearing consists of a brass bolt having a pivot bearing opening in its head to receive the shaft pivot. The head is also secured to a clip 57 comprising the support for the outer end of the compensating spiral 43. The shoulder of the bolt head is assembled against the inner surface of extension 54 with the bolt extending through the opening 55 and is secured by the nut 58. It will be noted that the threaded end of bolt 56 has a screw driver slot therein. When the nut 58 is loosened slightly the bolt may be turned with a screw driver to adjust the outer end of spiral 43 for calibration purposes and when adjusted as desired, the nut 58 is again tightened.

The plate 48 has a window opening 59 therein opposite a recess 60 in the block 47 and into which a bent down indicator tab 61 of the armature 44 may enter by turning of shaft 33 into the position where the flat under surface of the armature lies against and is attracted to the poles of the permanent magnet. This is the indicating position of the armature and is the position shown in Fig. 3 and in full lines in Fig. 6. In the preferred arrangement the armature has the non-indicating position indicated in dotted lines in Fig. 6 when the heater unit is cool. That is, the indicator tab 61 is raised so as not to show to any appreciable extent in the window 59. When the spiral 31 heats, it produces a clockwise torque on shaft 33. This torque is opposed by the adjusted tension of compensating spiral 43. Spiral 43 is subject to ambient temperature changes and when the ambient temperature increases, spiral 43 increases its counterclockwise torque on the shaft. Thus there is no net change in resultant torque due to ambient temperature changes. The permanent magnet 45 also produces a clockwise torque on shaft 33 by its attraction for the armature although this is a minimum when the armature is in the non-indicating, fully detracted position, and this latter position is determined by the outer end of the armature resting against the bent-over part 62 at the upper right corner of plate 48 acting as a stop. In the non-indicating position the armature air gap is about ⅛ of an inch.

Upon a predetermined heating of spiral 31 above ambient temperature, the armature snaps from non-indicating to indicating position, and when so operated, remains in the indicating position until reset by hand, even though spiral 31 cools again, because the permanent magnet holds such armature in attracted position. In order to make the position of the armature readily visible, we prefer to provide contrasting colors on the tab 61 and on the face of that part of block 60 which is visible through the window 59 when the armature 44 is in the raised or non-indicating position. Thus block part 60 may be black and the tab 61 white. As will be evident from Fig. 1, either of such indications is readily visible through the glass cover 11 of the watt-hour meter when our thermal indicator device is attached to such a meter. The positive action and permanent indication features obtained by the use of the permanent magnet are considered to be of great importance in the practicable design, accuracy of operation, and use of this device.

We will mention certain refinements having to do with the calibration and operation of the instrument later, after explaining the manner of connection of the heater units in various meter circuits.

In Fig. 7 we have shown the manner of connection of our heater elements in a three-wire meter, the two current coils of which are represented at 63 and 64. Here 12, 13, 14 and 15 represent the usual meter terminals of a watt-hour meter. In a three-wire meter usually employed for metering of a three-wire circuit, such as represented, one current coil 63 is connected between the outer terminals 12 and 15 and the other meter coil 64 is connected between the inner meter terminals 13 and 14. The circuit 65 represented may be considered as having 220 volts between the outer wires and 110 volts from each outer wire to the middle wire. The meter coils are thus connected in series with the outer wires. If our device were not present, the coil terminals would be connected directly to the meter terminals as at terminals 13 and 15. It is seen that the only essential requirement for attaching our thermal indicator device is the use of suitable bolts 66 and certain insulating washers and bushings. Heater element 20 is connected in series with meter coil 63 as follows. Current enters terminal 12 from the line, passes up through the bolt to the nut 67, enters the upper heater terminal through conducting washer 68, returns through the lower terminal of the heater element and enters the meter coil terminal 69. It is noted that the lower heater terminal and meter terminal 69 are insulated from the bolt and other connections by insulating bushing 70 and insulating washers 71 and 72. The meter terminal 69 is displaced from its usual position only by the thickness of insulating washer 72 and hence no objectionable bending of such meter terminal is necessary. Meter coil 64 is connected in series with the other heater 21 in like manner. As will be evident from the description of the construction and assembly of these heater elements they are well insulated from each other so there is no danger of short-circuit between them, notwithstanding their close proximity and a considerable difference in potential.

When our device is used in connection with a single phase, two-wire meter having one current coil, preferably only one heater is used or made active. The normal current connections for such a meter are indicated in Fig. 8. In using our device therewith the terminal 12 is connected in series with heater element 20 and with the current coil 63' of the meter just as in Fig. 7. Terminal 14 is now used only for a support insofar as the heater is concerned. A dummy heater element having no loop connection may be used in place of heater 21 or we may leave the heater 21 in place and simply interchange the insulating and conducting washers 72 and 68 so that the heater 21 is not in circuit. If the washers used at 72 and 68 are not of the correct dimensions for such interchanging, washers of the correct dimensions may be used instead. Such a connection is shown for the heater 21 in Fig. 4. It will be noted that this in no way interferes with the use of the terminal as a supporting structure. It is of course possible to connect both heaters in circuit for a two-wire meter, but this is unnecessary for reliable results since we have found that the device can be quickly calibrated for either arrangement. We prefer to use the same heater unit for both two-wire and three-wire meters and simply leave one heater element thereof out of circuit for the two-wire meter. As previously explained, the same device can then be used for either type of meter by a simple change in connections.

While the design details of our device may be varied over a considerable range, it may be desirable to give certain dimensions and other data which we have found to be satisfactory. The amount of heat generated by a heater element is determined by its resistance and the current flow therethrough. For the use which we contemplate we have used a manganin resistance heater .025 inch thick and .379 inch wide with approximately 1 of its length effectively within the heater shield assembly and having a resistance of approximately 0.0036 ohm. The thermal time response depends largely upon the heat storage capacity and the extent to which the spiral 31 is heat-insulated. The heat storage capacity is obtained primarily by the block 27, although this is increased by the copper shield clip 25 and by the spiral 31 and the heater elements themselves. Using die cast aluminum alloy, we have used a block 27 having outer dimensions approximately as follows: 1 inch in length, .562 inch wide and .28 inch in thickness. The dimensions of other parts of the device can be estimated from the relative proportions represented in the drawings since the parts are all drawn to approximately the same scale.

The heaters and heat storage material are fairly well insulated against heat loss by the heat insulating casing 37, although some heat is necessarily conveyed away from spiral 31 primarily through the heater terminals, the rivets 38, bolts 41 and shaft 33. We prefer, however, to make the shaft 33 of hard insulating material and use metal pivots pressed into the ends of this shaft to obtain minimum bearing friction since the excessive amount of heat that would be conveyed along an all-metal shaft would influence the temperature compensating spiral 43 undesirably.

For the spirals we have employed a bimetal of which the low expansive side is a nickel iron alloy containing 40 per cent nickel and 60 per cent iron, and the high expansive side is an alloy containing 22 per cent nickel, 3 per cent chromium and 75 per cent iron. The heater spiral 31 is .125 inch wide using bimetal about .0085 inch in total thickness, 8¼ inches in length, and having about 8 turns in its free coiled position, under which condition the spiral has an outside diameter of about one-half inch. The compensating spiral is similar except as to its width and outside diameter. We found that a slightly narrower width of compensating spiral of about .115 inch improved the temperature compensation. Also, by increasing the outer diameter to about ⅝ of an inch, greater spacing between turns could be obtained and thus the possibility of the turns touching during adjustment was reduced. Such a combination gives good overall characteristics and good temperature compensation with a desirable time lag. We also found that it was desirable to obtain a certain degree of ambient temperature compensation by matching the temperature-deflection characteristics of the bimetal against the watts-input-temperature rise characteristics of the device. This can be explained by the use of the curves of Figs. 9 and 10. In Fig. 9 we have shown the deflection response of the bimetal used as a function of temperature rise and in Fig. 10 we have plotted watts input of the device against temperature rise of the heated spiral. Owing to the fact that the heat loss increases at an accelerated rate with increase in temperature, the watt-input-temperature rise curve is not a straight line but curves as is shown in Fig. 10. Hence if we relate the various factors involved so that the useful temperature range of the particular bimetal used corresponds to that part of the curve, Fig. 9, over which its degree of response increases with temperature, the over-all response of our device becomes substantially proportional to the watts input into the heaters which is the result desired. This useful temperature range lies between about −40 and +200 degrees C. for the arrangement described and is the range over which this particular device is intended to be operated.

Fig. 11 shows the characteristic curve of our device when operating current is plotted against time to trip. We have chosen to define the rated current of the device as the minimum operating current as shown in Fig. 11. The operating current scale is given in per cent since the minimum operating current of our device may be varied over a wide range by simply adjusting the tension of the temperature compensating spiral 43. By operating current we mean that current value which will cause the indicator 61 to snap from a non-indicating position to an indicating position. To give a practicable example, assume we desire a device with a 15 ampere rating, or a device which with 15 amperes current flowing through both heater elements will produce such a temperature rise in spiral 31 as to cause its torque to increase to a point where, together with the pull of the magnet 45 on armature 44, will almost overcome the counter torque of spiral 43 at ambient temperature and be just ready to cause armature 44 to snap from non-indicating to indicating position. Any increase in this current will cause the armature to snap and any decrease in the current will keep the armature from snapping. Fig. 11 shows the characteristic curve of such a device. It is noted that with 100 per cent current the device will trip theoretically in an infinite time. The same device will operate in a lesser time with a greater current flow. Thus, for 110 per cent current the device will operate in 11 minutes, and for 150 per cent current in 4.5 minutes. To adjust our device for the 15 ampere rating, the armature 44 is moved to the non-indicating position with the spiral 43 adjusted to a low tension and the device energized at 15 amperes. After a suitable time interval has elapsed, say in 45 minutes, spiral 42 is tightened, gradually turning arm 57 in a clockwise direction until armature 44 just snaps to the indicating position and arm 57 is then locked in position with nut 58.

If the device has been properly made and assembled, as explained herein, this calibration will be accurate for the ordinary range of ambient temperature variation experienced in practice. The armature will not return to the non-indicating position by itself even though the current be cut off and the heaters allowed to cool. Hence the indication is permanent until the device is reset by hand, which may be done after it has cooled slightly. The same device will operate in the same manner with an equivalent heating current flowing through one heater and none through the other. The single heater current equivalent to balanced currents of 15 amperes flowing in both heaters is calculated as follows: The heating effect of the two 15 ampere currents is proportional to the arithmetical sum of the squares of these currents or 450. The equivalent heating current through one heater is then $$\sqrt{450} = 21$$

amperes approximately. Hence our device may have a rated current of 15 amperes in a balanced 3 wire circuit or 21 amperes in a 2 wire circuit for the same ambient spiral setting. Various other current ratings between approximately 15 amperes and 30 amperes may be obtained by similar calibrating procedure. Likewise the time factor of the rating might be changed. The curve indicates that the device which is rated at 100 per cent current in an infinite time might be rated at 110 per cent and 11 minutes time interval, etc. However, for rating of the device we have chosen to use the minimum operating current for a given setting of the calibrating spiral, i. e., the current below which the device would never operate but above which the device would always operate in some finite time. The watts loss of the device at the operating point for the 15 ampere operating current is approximately 1.8 watts, and for the 30 ampere operating current about approximately 7.2 watts. The device is capable of withstanding up to 60 amperes load for 1 hour without burning out and voltage tests up to 3000 volts between heaters and 2500 volts between heaters and ground. The current ratings above given represent the approximate current range of the particular device described over which reasonable accuracy can be expected for this type of device with the usual ambient temperature variations.

This current range fills the gap where a reliable demand indicator of low cost is needed. We have also outlined the principles of design so that other ratings can be readily designed and hence we do not wish to limit our invention to the particular design factors herein explained. For instance the current rating may be raised by using a heater unit having lower resistance heaters.

Our device gives a permanent indication of the occurrence of a demand which exceeds a predetermined value for which the device is set.

It is not contended that our device is 100 per cent accurate but great care has been taken in its design to make it as accurate as possible for such a small low-cost device and it is sufficiently accurate for the purpose for which intended. A very important factor in the accuracy of operation of this device is that the effect of friction has largely been eliminated. The indicator has two stationary positions, and although friction is present when the indicator moves from the non-indicating position to the indicating position, the moving force greatly increases the instant there is any motion whatever so that for all practicable purposes, dynamic friction does not enter into the calibration and operation of this device as it does in the ordinary indicating type of instrument. The resulting snap action of the indicator is satisfactory for relay control purposes and such use is contemplated. Calibration by movement of spiral 43 does not move any other part of the device and we have found that this feature contributes to very consistent operation. This adjustment can be made with the device installed in place on a watthour meter.

In the device described above, 90 per cent of the final temperature rise of the heated spiral is reached in approximately 12 minutes. It may be desirable for some applications (for example) where more or less account is to be taken of high currents of short duration) to have a greater or lesser amount of thermal lagging so that 90 per cent of the final temperature rise would be reached in a longer or shorter time.

Our device may be quite readily designed for different thermal lagging, for example, by substituting for the heat storage block 27, a block containing more or less metal or a metal with a greater or smaller specific heat factor without changing the dimensions necessary for correct assembly with the remaining parts of the device.

What we claim as new and desire to secure by Letters Patent of the United States, is:

1. A thermally responsive device comprising a pair of loop-shaped resistance heaters, each having closely spaced terminals with aligned bolt openings, means for securing said heaters in closely spaced insulated relation with their terminals exposed in positions to be bolted to spaced terminal blocks, a heat storage block in good thermal relation to said heaters, a casing of low heat conductivity material substantially enclosing said block and heaters, a rotary shaft of low heat conductivity extending through a wall of said casing, a bimetallic thermally responsive spiral in a cavity of said block having its one end secured to said block and its other end secured to said shaft, a temperature compensating bimetallic spiral exterior of said casing having one end secured to said shaft and its other end secured in adjustable relation with respect to said casing, a permanent magnet secured on said casing, an armature therefor secured to said shaft, said armature having attracted and detracted positions which limit the movement of said armature and shaft, the incased spiral producing a turning bias on said shaft in the same direction as the pull of the magnet and which turning bias increases with the temperature of such incased spiral, the compensating spiral producing an opposed turning bias on said shaft, said device being adjusted to retain the armature in detracted position when there is no heating of the incased spiral, to snap the armature from detracted to attracted position upon a predetermined temperature rise of the incased spiral with respect to the compensating spiral and to hold said armature in attracted position under all temperature conditions.

2. A thermal responsive device comprising two separable parts, one part comprising a pair of resistance heaters with supporting structure which insulates the heaters from each other and unites them into a compact integral structure, said heaters having terminals for connecting them in series with current circuits and being sufficiently rigid to serve as fastening supports for the device, the other part comprising a temperature compensated thermal demand indicator having facilities for removably securing the same on the heater structure part with the thermal responsive means thereof in good thermal relation with such heaters, said demand indicator having a movable part which has only two stationary positions, one indicating that the demand has not exceeded a predetermined amount and the other that the demand has exceeded such predetermined amount and permanent magnet means for causing said movable part to move from the first to the second mentioned indicating positions suddenly and for holding such movable part in the second mentioned indicating position regardless of the demand until reset to the first mentioned position manually.

EDWARD E. LYNCH.
HERBERT C. THOMAS.
SAMUEL GABRIELSON.